US009596242B2

(12) United States Patent
Ito

(10) Patent No.: US 9,596,242 B2
(45) Date of Patent: Mar. 14, 2017

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Mario Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 14/286,154

(22) Filed: May 23, 2014

(65) Prior Publication Data

US 2014/0359125 A1 Dec. 4, 2014

(30) Foreign Application Priority Data

Jun. 4, 2013 (JP) ................................. 2013-118304

(51) Int. Cl.
*H04L 29/06* (2006.01)
(52) U.S. Cl.
CPC ..................................... *H04L 63/10* (2013.01)
(58) Field of Classification Search
CPC ........................................................ H04L 63/10
USPC ........................................................... 709/225
See application file for complete search history.

(56) References Cited

U.S. PATENT DOCUMENTS

| 8,326,989 B2 * | 12/2012 | Yamamoto | .......... G06F 17/3028 709/223 |
| 2011/0125899 A1 * | 5/2011 | Yamamoto | .......... G06F 17/3028 709/225 |
| 2011/0246602 A1 * | 10/2011 | Mihara | ............... H04L 29/0809 709/217 |
| 2013/0094063 A1 * | 4/2013 | Takagi | ................... G06K 15/02 358/3.28 |
| 2013/0145183 A1 * | 6/2013 | Wada | ........................ G06F 1/26 713/300 |
| 2014/0215576 A1 * | 7/2014 | Sugiyama | ................ H04N 1/44 726/4 |
| 2014/0237546 A1 * | 8/2014 | Nakayama | .............. H04L 63/08 726/3 |
| 2015/0067800 A1 * | 3/2015 | Hosoda | ................... G06F 21/31 726/6 |
| 2015/0373211 A1 * | 12/2015 | Minamikawa | ..... H04N 1/00973 358/1.15 |

FOREIGN PATENT DOCUMENTS

JP    2011-008349 A    1/2011

OTHER PUBLICATIONS

RFC 6101, "The Secure Sockets Layer (SSL) Protocol Version 3.0", Aug. 2011, 134 pages.*

* cited by examiner

*Primary Examiner* — Jerry Dennison
(74) *Attorney, Agent, or Firm* — Fitzpatrick, Cella, Harper & Scinto

(57) ABSTRACT

An information processing apparatus receives a request from a Web server over a network, adds security information to the request, and determines whether to process the request, based on the security information which is added to the request.

10 Claims, 7 Drawing Sheets

FIG. 7

```
700
HTTP/1.1 200 OK
Date: Tue, 21 Sep 2010 07:42:11 GMT
Server: Nicrosoft-IIS/6.0
Cashe-Control: private
701 — X-Webservice-ServiceAddress: http://192.168.0.2:8000/aa/bb
702 — X-Webservice-ContentType: application/soap+xml
703 — X-Webservice-UploadAddress: http://aaa.co.jp/bbb/ccc
704 — Content=Type: application/vnd.abc.webservice
Content-Length: 2388
```

FIG. 8A

```
800
<?xml version="1.0" encoding="UTF-8"?>
<InformationService xmlns="http://www.xxxxx.info/job">
   <GetInformation>
      <RequestItems>
801 —    <item>DeviceSerialNumber</item>
      </RequestItems>
   </GetInformation>
</InformationService>
```

FIG. 8B

```
810
<?xml version="1.0" encoding="UTF-8"?>
<InformationResponse
   xmlns="http://www.xxxxx.info/jobResponse">
811 —  <ResultCode>ok<ResultCode>
   <ResponseItems>
812 —    <DeviceSerialNumber>aaa12345</DeviceSerialNumber>
   </ResponseItems>
</InformationResponse>
```

FIG. 8C

```
820
<?xml version="1.0" encoding="UTF-8"?>
<InformationResponse
   xmlns="http://www.xxxxx.info/jobResponse">
821 —  <ResultCode>ng<ResultCode>
</InformationResponse>
```

```
GET /service/info HTTP/1.1
Host: 127.0.0.1
Connection: close
Accept-Language: ja-JP
Cashe-Control: no-cache
X-MEAPWEB-FROM: webservice-example.abc.co.jp
X-MEAPWEB-SSLUSED: true
Content-Type: application/soap+xml
```

901 { (X-MEAPWEB-FROM, X-MEAPWEB-SSLUSED lines)

| 192.168.38.100 |
| webservice-example.abc.co.jp |
| scan-web-app.abc.co.jp |

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus having a Web browser, connected to a Web server, that displays operation screens provided from the Web server, to a method of controlling the same, and to a storage medium.

Description of the Related Art

An information processing apparatus such as a PC, or the like, being connected to a Web server on a network, and displaying operation screens provided by the Web server on a Web browser that the information processing apparatus is provided with is known. In such a case, firstly, the Web browser of the information processing apparatus requests (request) information of an operation screen of the Web server. In response to this request, a Web application of the Web server transmits (response), to the information processing apparatus, HTML data in order to cause the Web browser to display the operation screen. With this, the Web browser of the information processing apparatus analyzes the received HTML data, and displays the operation screen based on the definition of that HTML data. Furthermore, when a user inputs an instruction via the operation screen displayed by the Web browser, the Web browser notifies the Web server of that input instruction. Then, a Web application of the Web server having received the notification executes processing in accordance with that input instruction.

Note, in recent years, there are multi function peripherals (MFP) having a scanner, a printer, or the like, that are provided with Web browsers such as those described above. These kinds of MFPs display operation screens provided by a Web server using the above described procedure with the Web browser of the MFP, and accept various instructions from users. Furthermore, systems in which a Web server provides an operation screen with which to input instructions for using various functions that the MFP is provided with, and a user inputs instructions into the MFP via the provided operation screen are being considered. With such systems, the Web server requests of the MFP the execution of various processing in accordance with the content of the instructions input by the user. A job execution module of the MFP that received this request executes the requested processing. With this, it becomes unnecessary to hold all of the operation screen information for operating the MFP in the MFP, and the modification of an operation screen can be performed easily on the Web server.

More specifically, an approach of publishing various functions of the MFP with RPCs (Remote Procedure Call), and calling functions that are instructed from the Web server as appropriate is being considered. In this approach, by having the main logic of the processing in the Web server, and causing the Web server to execute control of the MFP, user interactive processing, or the like, a processing load on the MFP can be reduced. For example, by publishing functions of the MFP as Web services, the MFP can call a local subroutine of the Web server, and execute a function that the MFP provides. Also, by managing the response to such a call, it is possible to have the main logic of the processing in the Web server.

However, because an RPC is initiated by the client transmitting a request message to the server, it is necessary for a communication connection to be made from the client to the server that provides the service. In other words, in this approach, in a case where the MFP is protected by a firewall, or is in an environment in which network address translation is used, the MFP cannot receive RPC requests from a Web server existing on an external network. This is because firewalls generally permit connections from within to the outside, but do not permit connections from outside to within. Also, this is because, in a case where the MFP is in an environment using address translation, the MFP cannot be identified from the server side.

Here, operating by a Web server providing a control script based on an instruction input via an operation screen displayed by a Web browser of a device, and the device executing that control script is conceivable. The control script is received by the Web browser as a response corresponding to a request from the Web browser, and is transferred to the job execution module. For this reason, it is not necessary to make a connection from the Web server to the MFP, and usage is possible even in a case where the MFP is protected by a firewall, or is in an environment that uses network address translation.

However, in a case when this kind of arrangement is used, the job execution module cannot know which server the request is from in a case where there are a plurality of processing request request source servers. This is because it is the Web browser that receives the control script, and the job execution module merely receives the control script transferred from the Web browser. For example, in a case where the job execution module is a module for providing information of the device, or of the user that is using the device, from the viewpoint of security, there are cases where it is desirable that the job execution module only executes requests from particular servers, but this cannot be realized due to the above described problem.

Here, a technique such as that of Japanese Patent Laid-Open No. 2011-8349 is being considered. In the method recited in Japanese Patent Laid-Open No. 2011-8349, by putting necessary information in an HTTP request header when the Web browser accesses the Web server, information of the device is communicated to the Web server. Also, here, it is determined whether or not an accessing URI matches a pattern stored in advance, and in a case of a match, the information is transmitted.

However, because in the method of Japanese Patent Laid-Open No. 2011-8349, information is added every time the Web browser accesses the Web server, there is a problem in that a communication cost is incurred when there is a large amount of information transmitted. Also, from the viewpoint of security, it is advantageous to suppress the number of transmissions to a minimum by not transmitting information in a case where a Web application is not necessary.

SUMMARY OF THE INVENTION

The present invention enables realization of being able to obtain information only from a Web server that is trusted and keeping transmissions of information from an information processing apparatus to a minimum even in a case where the information processing apparatus is protected by a firewall.

One aspect of the present invention provides an information processing apparatus comprising: a network communication unit configured to receive a request from a Web server over a network; adding unit configured to add security information to the request when the network communication unit has received the request in accordance with a specific a receiving condition; a control unit configured to determine whether to process the request, based on the security information which is added to the request.

Another aspect of the present invention provides a method for controlling an information processing apparatus, the method comprising: in a network communication unit, receiving a request from a Web server via a network, and adding security information to the request when receiving the request in accordance with a specific a receiving condition; and in a control unit, processing the request, based on the security information which is added to the request.

Still another aspect of the present invention provides a non-transitory computer-readable storage medium storing a computer program for causing a computer to function as the information processing apparatus.

Further features of the present invention will be apparent from the following description of exemplary embodiments with reference to the attached drawings.

BRIEF DESCRIPTION OF THE DRAWINGS

FIG. 7 is a view for illustrating an example of an HTTP response header that the Web application returns to the Web browser according to embodiments.

FIGS. 8A-8C are views for showing examples the content of processing requests returned as responses, and 8A is a view for showing an example that the Web application generates and returns to the Web browser as a response, 8B is a view for showing an example that the service provider generates and returns to a transfer application as a response, and 8C is a view for showing an example of an error result that the service provider generates and returns to the transfer application as a response.

FIG. 9 is a view for showing an example of the content of an HTTP request header when the transfer application transfers a processing request to the service provider.

FIG. 10 is a view for showing an example of content of reliability information stored in a reliability information storage unit of the MFP according to embodiments.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
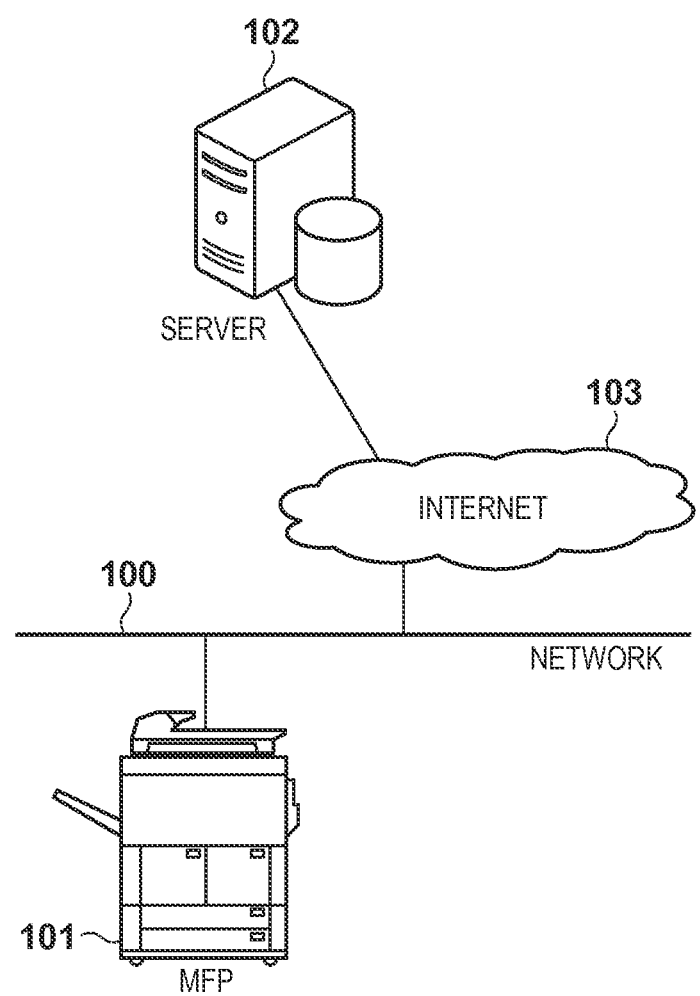
FIG. 1 is a view for illustrating an example configuration of a communications system including an information processing apparatus according to embodiments of the present invention.

FIG. 1 is a view for illustrating an example configuration of a communications system including an information processing apparatus (MFP) according to embodiments of the present invention. In this embodiment, explanation will be given for an example of a multi function peripheral (MFP) connected to a Web server and having a Web browser on which operation screens provided from the Web server are displayable, but the present invention is not limited to this, and an information processing apparatus such as a PC may be used alternatively.

This communications system has an MFP 101 and a server 102 connected via a network 100. The network 100 is a foundation bed for performance of communication between the apparatuses, and is connected to the Internet 103. The MFP 101 may be an information processing apparatus such as a general purpose PC if it has a Web browser function. Furthermore, the MFP 101 may be managed by a local IP address. In such a case, a gateway (not shown) exists between the network 100 and the MFP 101, and the gateway performs address translation. For example, a router is included in the gateway. Also, the gateway, the MFP 101, or the like, may be equipped with a firewall function. The server 102 has a function for distributing Web content via a network, and returns Web content in reply to requests from the MFP 101.

Figure 2:
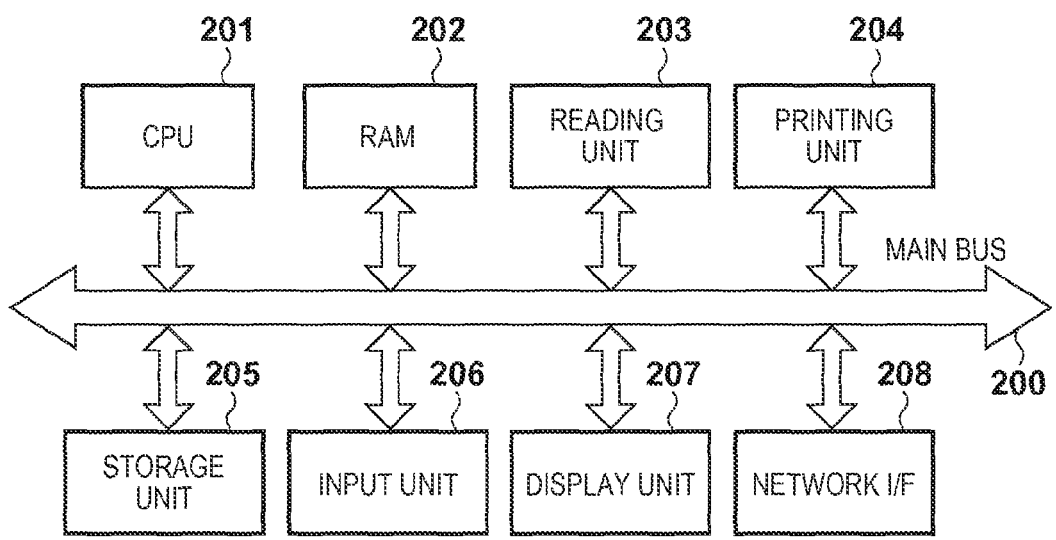
FIG. 2 is a block diagram for explaining a hardware configuration of an MFP according to embodiments.

FIG. 2 is a block diagram for explaining a hardware configuration of the MFP 101 according to embodiments.

The MFP 101 according to embodiments has a CPU 201, a RAM 202 that provides a work area for the CPU 201, a reading unit 203 that reads an image of an original, and a printing unit 204 that prints images. A storage unit 205 stores programs that the CPU 201 executes, various settings, or the like. The storage unit 205 may be an HDD (hard disk drive), an NVRAM (non-volatile memory), or the like, for example. Furthermore, an input unit 206 with which a user performs command input, a display unit 207 which displays operation screens, or the like, a network interface (I/F) 208 which performs communication with another apparatus over a network, and a main bus 200 are comprised. Note, in this embodiment, while there is no particular limitation, in the MFP 101, the CPU 201 controls, via the main bus 200, the RAM 202, the reading unit 203, the printing unit 204, the storage unit 205, the input unit 206, the display unit 207, and the network interface 208. In addition, the display unit 207 may also be used as an input unit 206 as with a touch panel display.

Figure 3:
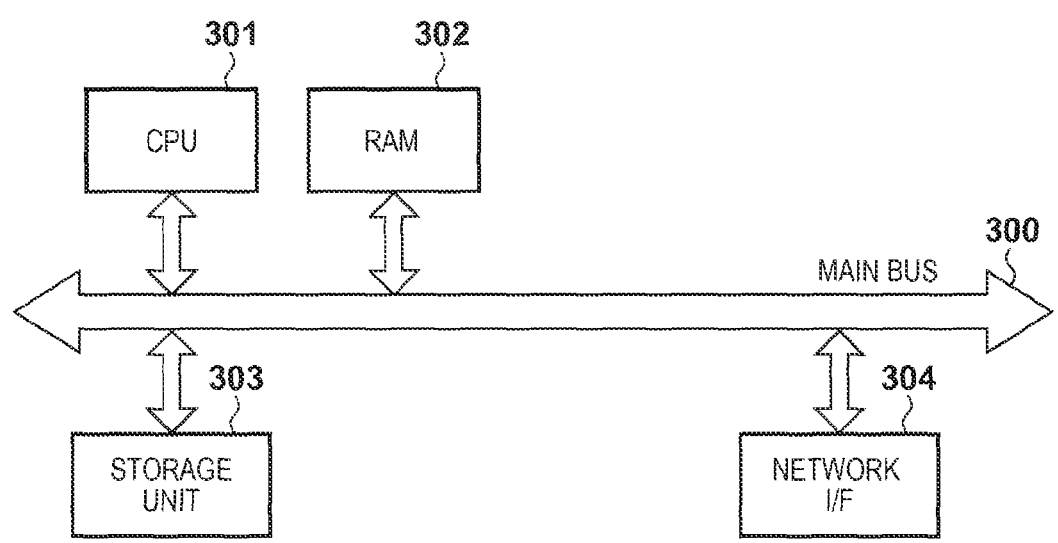
FIG. 3 is a block diagram for explaining a hardware configuration of a server according to embodiments.

FIG. 3 is a block diagram for explaining a hardware configuration of the server 102 according to embodiments.

The server 102 according to embodiments has a CPU 301, a RAM 302 that provides a work area for the CPU 301, a storage unit 303 that stores programs that the CPU 301 executes, various settings, or the like, and a network interface 304 that performs communication with another apparatus over the network. A main bus 300 connects the above described units and the CPU 301, and transmits data signals, various control signals, or the like. Note, in this embodiment, while there is no particular limitation, the CPU 301 controls the RAM 302, the storage unit 303, and the network interface 304 via the main bus 300.

Figure 4:
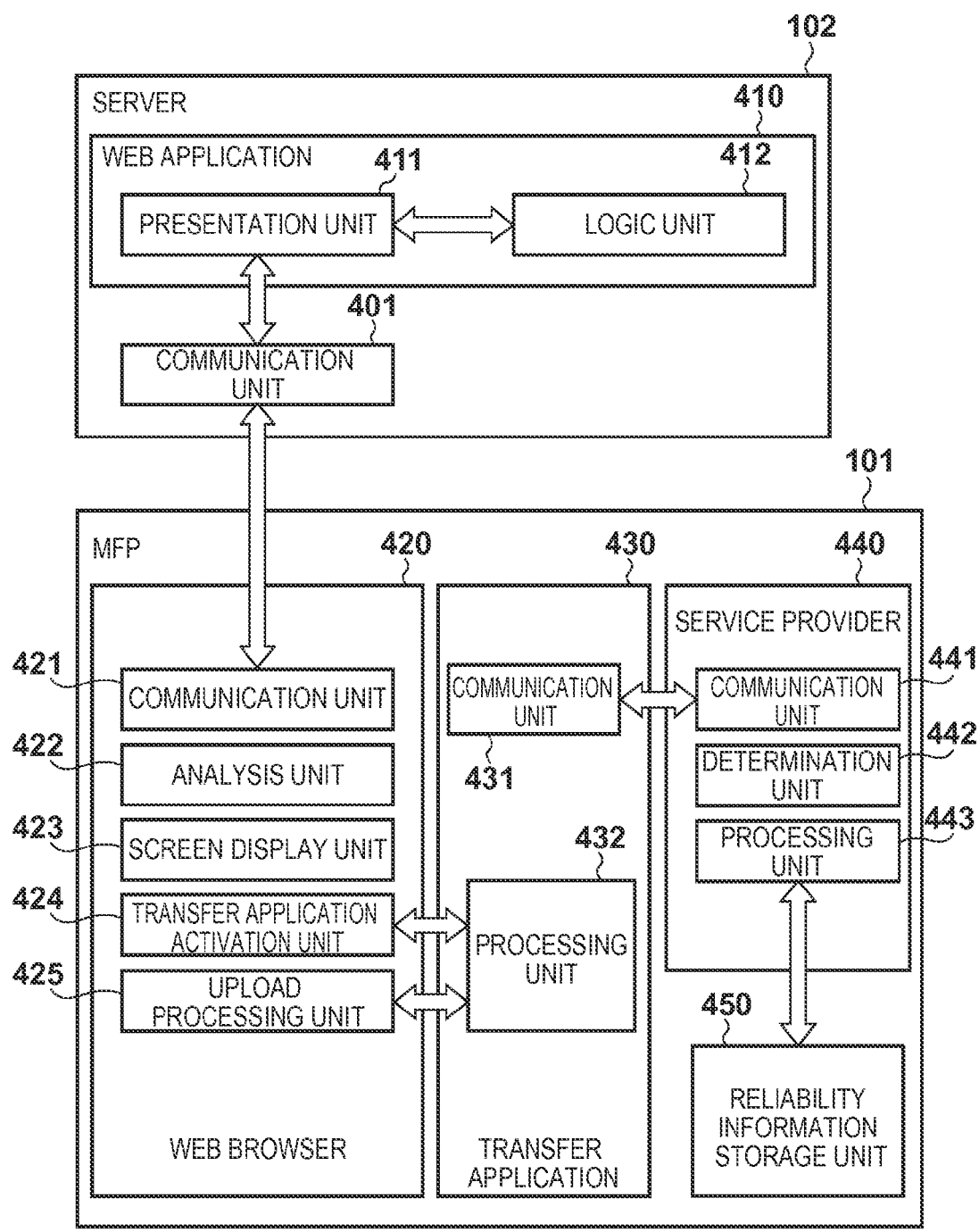
FIG. 4 is a view for explaining an overall software configuration of the communications system according to embodiments.

FIG. 4 is a view for explaining an overall software configuration of the communications system according to embodiments.

Each functional unit shown in FIG. 4 is realized by the CPU 201 or the CPU 301, comprised in the MFP 101 and the server 102 respectively, executing a corresponding control program.

The server 102 comprises a Web application 410 and a communication unit 401. Furthermore, a presentation unit 411 and a logic unit 412 are included in the Web application 410.

The presentation unit 411 transmits operation screens to be displayed by a Web browser 420 of the MFP 101 or processing requests to a service provider 440 to the MFP 101 as responses in response to requests from the MFP 101 received via the communication unit 401. Also, input information from a user input via an operation screen displayed by the Web browser 420 of the MFP 101 is received from the MFP 101 via the communication unit 401.

The logic unit 412 performs processing in response to input information from the MFP 101 transferred from the presentation unit 411. For example, in accordance with the input from a user, it changes screens to be displayed, and generates processing requests for causing functions of the MFP 101 to execute. The communication unit 401 is a software module for performing communication by the HTTP protocol by controlling the network interface 304.

On the other hand, the MFP 101 comprises the Web browser 420, a transfer application 430, the service provider 440, and a reliability information storage unit 450. The Web browser 420, the transfer application 430, the service provider 440 and the reliability information storage unit 450 are each realized by the CPU 201, which the MFP 101 comprises, executing a control program. Note, the Web browser 420 is not limited to displaying content of the server 102. Similarly, the server 102 is not limited to a Web server that transmits and receives requests and responses in accordance with the HTTP protocol. The Web browser 420 may have a function for acquiring content by performing communication with a server and displaying it in a screen.

The Web browser 420 comprises a communication unit 421, an analysis unit 422, a screen display unit 423, a transfer application activation unit 424, and an upload processing unit 425. The communication unit 421 communicates with the presentation unit 411 of the Web application 410 via the communication unit 401 of the server 102 in accordance with the HTTP protocol. More specifically, the communication unit 421 transmits information input via an operation screen displayed by the Web browser 420 to the Web application 410 as a request. Also, the communication unit 421 receives a response transmitted from the Web application 410.

The analysis unit 422 analyzes responses received from the Web application 410. In the response, HTML data which is a definition representing the content of an operation screen to be displayed on the Web browser 420, processing requests to the service provider 440, or the like, is described. The analysis unit 422 determines whether or not a Content-Type field of an HTTP response header matches with predetermined information (for example, application/vnd.abc.Web-service). Then, in a case where it is determined that it matches, processing corresponding to the response received is requested of the transfer application activation unit 424. The screen display unit 423 displays operation screens on the display unit 207 in accordance with the HTML data based on an analysis result made by the analysis unit 422.

The transfer application activation unit 424 requests the transfer application 430 so that it transfers by treating a processing request as a response received from the Web application 410 based on the analysis result made by the analysis unit 422. Note, if it can be determined whether or not the response is a processing request to the MFP 101, an approach other than referencing the HTTP response header may be used. Also, when transfer of a response is requested, various information regarding the communication between the Web application 410 and the Web browser 420 is transferred to the transfer application 430 as security information. This information includes, for example, an address of the communication destination server, the existence or absence of encryption when communicating, or the like.

The upload processing unit 425 transmits designated data to the server 102 via the communication unit 421 in accordance with a request of the MFP 101. In this embodiment, designated data is uploaded using the HTTP POST command, but any protocol that the Web browser 420 can process may be used.

The transfer application 430 comprises a communication unit 431 and a processing unit 432.

The communication unit 431 receives a request from the processing unit 432, and transfers a processing request using the HTTP POST command to a communication unit 441 of the service provider 440, and receives the result corresponding to that processing request.

The processing unit 432 receives a request from the transfer application activation unit 424 of the Web browser 420 and transfers the processing request to the service provider 440 via the communication unit 431. Here, it is transferred to a destination described in a header of the response received from the Web application 410. Also, security information received from the Web browser 420 is added to the HTTP request header. A destination of the HTTP request header (701 in FIG. 7), and security information (901 in FIG. 9) will be explained later.

The transfer application 430 operates as a helper application that makes it so that a file of a format that the Web browser generally cannot handle (audio, a moving image, animation, or the like) is possible to process, and operates independently from the Web browser. However, if there is a function for performing the transfer of the processing request, the transfer application may exist as a plug-in, a function in the Web browser, or JavaScript (registered trademark) described in the received response, rather than as a helper application.

Next, the service provider 440 comprises the communication unit 441, a determination unit 442, and a processing unit 443.

The communication unit 441 receives processing requests and security information from the transfer application 430. The determination unit 442 determines whether or not to execute processing from the received security information, and information saved in the reliability information storage unit 450. More specifically, the determination unit 442 compares information for identifying the Web server, such as an IP address saved in the reliability information storage unit 450, against information for identifying the Web server such as an IP address included in the security information. In this embodiment, an IP address, a host name, or the like, of the Web server on which the Web application exists are saved in the reliability information storage unit 450, and the determination unit 442 makes a request to the processing unit 443 so that processing is executed if it is a processing request from a server matching these.

The processing unit 443 accepts the processing request that the communication unit 441 received, and executes the requested processing. In this embodiment, identification information of the MFP 101 is acquired, and its identifier is returned as the processing result.

The reliability information storage unit 450, as mentioned previously, saves the IP address, the host name, or the like, of the Web server as information for identifying a trusted Web server. However, if the Web server that performed the processing request can be identified, this information may be any kind of information. Also, the reliability information storage unit 450, if within the MFP 101, may exist as a portion of the service provider 440, the Web browser 420, or the like. In the present embodiment, the information stored in the reliability information storage unit 450 may be input by the user and saved in advance and the MFP 101 may have an interface (not shown) for the user to input this reliability information.

Figure 5:
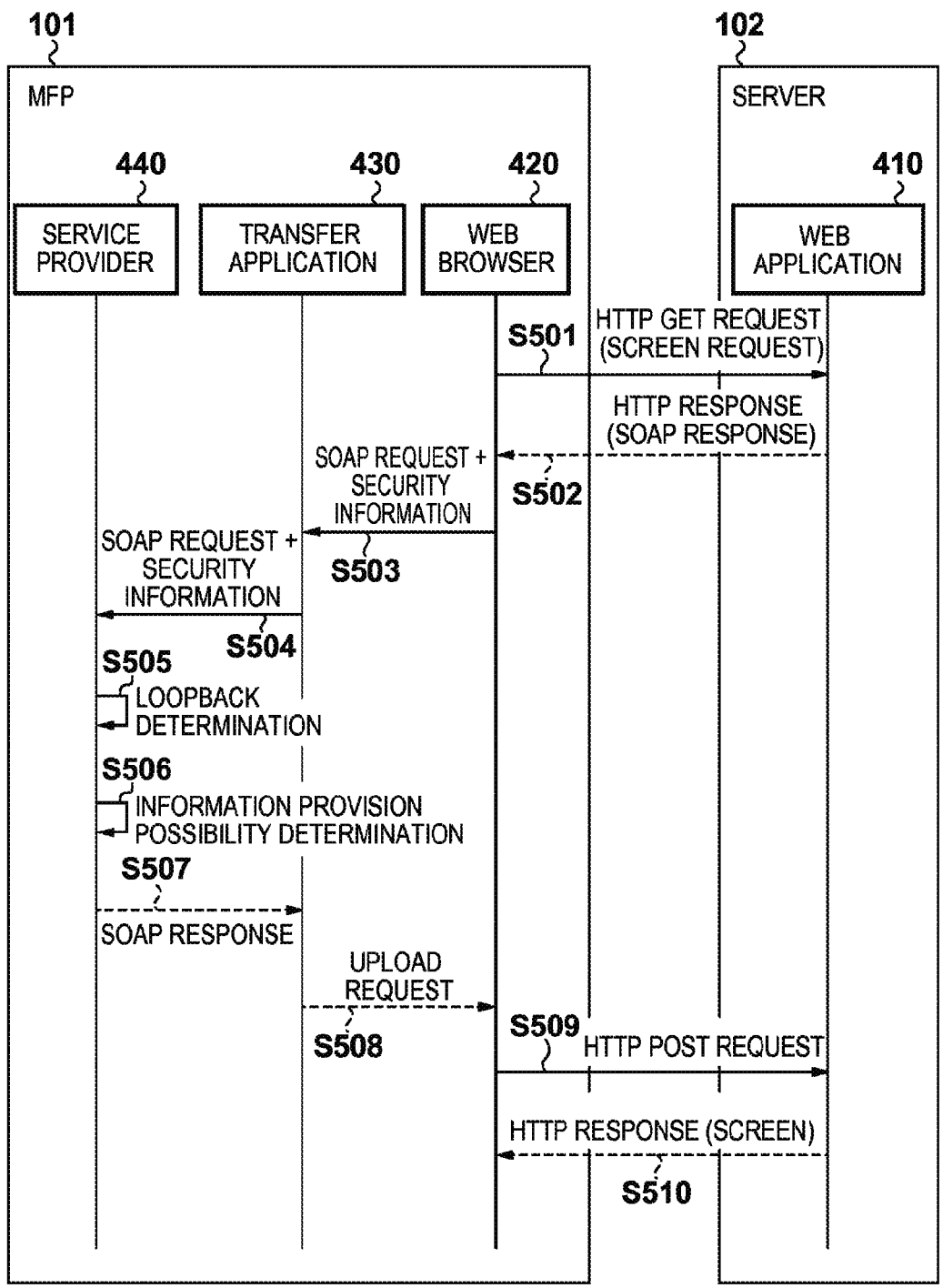
FIG. 5 is a sequence diagram for explaining a flow of a processing sequence in the communications system according to the embodiment.

FIG. 5 is a sequence diagram for explaining a flow of a processing sequence in the communications system according to the embodiment. Below, with reference to the sequence diagram, explanation will be given for processing executed in this system. The processing represented in this sequence diagram returns a unique screen in accordance with a device serial number for the Web browser 420, the Web application 410 having acquired the serial number of the device of the MFP 101.

Firstly, in step S501, when a pressing of a button (not shown) for activating the Web browser 420 by a user is received from the input unit 206 of the MFP 101, the Web browser 420 is activated. This button is not limited to a hardware button and may be a button displayed on a touch panel of the display unit 207. Then, the Web browser 420 makes a request for screen information to the Web application 410 on the server 102 when activated. In this embodiment, it is assumed that a URL indicating content of the screen is set in the MFP 101 in advance.

Here, the Web browser 420 performs the request with an HTTP GET command to the Web application 410 maintaining the content shown by that URL. More specifically, the Web browser 420 performs communication with the communication unit 401 of the server 102 by the HTTP protocol via the communication unit 421. The communication unit 401 transfers the received data to the appropriate Web application in accordance with the URL received from the MFP 101. With this, requests are performed from the Web browser 420 to the Web application 410. Below, explanation will be given omitting the operation of the communication unit 401, and the communication unit 421.

Next, in step S502, the logic unit 412 of the Web application 410, based on the information transmitted in step S501, generates a processing request as an HTTP response header and an HTTP response body. Then, it transmits to the Web browser 420 the HTTP response header and the HTTP response body combined together as an HTTP response. With this, the Web browser 420 receives the HTTP response that the Web application 410 transmitted. In this HTTP response is included the HTTP response header and the processing request. Detailed explanation will be given later for this.

In step S503, the analysis unit 422 determines whether or not the Content-Type field of the HTTP response header received in step S502 matches predetermined information (for example, application/vnd.abc.Webservice). In the case of a match, the transfer application activation unit 424 makes a request to the processing unit 432 of the transfer application 430 so that the HTTP response body received in step S502 is transferred by transmitting to the service provider 440. Here, the HTTP response header received in step S502 is passed to the transfer application 430 as information necessary for the transfer, and an IP address of the Web server on which the Web application 410 is operating is passed to the transfer application 430 as security information. Furthermore, information as to whether or not communication between the Web browser 420 and the Web application 410 is encrypted is passed to the transfer application 430. Note, in a case where the Content-Type field and the predetermined information do not match, the analysis unit 422 displays an operation screen on the display unit 207 based upon result of analysis of the HTML data.

In step S504, the processing unit 432 of the transfer application 430 transmits, via the communication unit 431, the HTTP response body, and the security information received in step S503 to a destination described in the HTTP response header received in step S503.

In this embodiment, it is transmitted to the service provider 440 using the HTTP POST command, but another approach other than this transmission approach may be used. Next, the service provider 440 receives the processing request and security information that the transfer application 430 transmitted with the communication unit 441. In this embodiment, the service provider 440 receives the request from the transfer application 430. However, if the environment is such that direct communication from the Web application 410 to the MFP 101 is possible, it is possible to receive a direct request from the Web application 410.

In step S505, the determination unit 442 of the service provider 440 confirms whether or not the processing request received by the communication unit 441 in step S504 is sent from a loopback address (localhost, 127.0.0.1, etc.).

In step S506, the determination unit 442 of the service provider 440, referencing the reliability information storage unit 450, determines whether or not the transmission source address of the processing request made in step S504 is included in the information stored in the reliability information storage unit 450. Here, the determination unit 442, based on the confirmation result of step S505, identifies the transmission source address from the security information received in step S504 if it is communication from a loopback address, and if not, identifies the transmission source address based on information when actual communication is performed.

The determination unit 442 determines that the transmission source can be trusted if the transmission source address is stored in the reliability information storage unit 450, and as a consequence the processing unit 443 executes the processing in accordance with the processing request received in step S503. If not, it determines that the transmission source cannot be trusted, and does not execute the processing. Also, in the determination of whether or not the transmission source can be trusted, determination may be made based on various information related to security other than the transmission source address such as whether communicating between the Web application 410 and the MFP 101 is encrypted. In this embodiment, because the processing request is sent from a loopback address, identification of the transmission source address is made from the security information.

In step S506, in a case where the determination unit 442 determines that the request source of the processing request can be trusted, the service provider 440 of the MFP 102 transmits the processing result to the transfer application 430 via the communication unit 441 in step S507 as a response to the request received in step S504. On the other hand, in a case where the request source of the processing request determines that the request source of the processing request cannot be trusted, it transmits an error result. The processing unit 432 of the transfer application 430 receives the processing result or the error result via the communication unit 431 from the service provider 440.

In step S508, the processing unit 433 of the transfer application 430 makes a request to the upload processing unit 425 of the Web browser 420 so that the processing result or the error result is uploaded to the Web application 410. Upon this request, the processing unit 432 specifies the upload destination as the destination for upload to the upload processing unit 425. This upload destination is described in the HTTP response header, and the Web browser 420 may save this information and this information may be used without specifying from the transfer application 430 to the upload processing unit 425. Also, the destination may be made to be a fixed value, and configuration may be taken such that it is not specified from the Web application 410.

In step S509, the upload processing unit 425 uploads the processing result or the error result in accordance with the request from the processing unit 433 by an HTTP POST command via the communication unit 421. Here, the upload is performed to the destination requested from the processing unit 432 of the transfer application 430.

In step S510, the Web application 410 generates HTML content for a screen display in accordance with the processing result or the error result received in the upload in step S509, and makes a response to the Web browser 420. The Web browser 420, having received this response, displays the operation screen on the display unit 207 based upon result of analysis the HTML content for screen display by the analysis unit 422.

In this way, by virtue of the MFP 101 according to the embodiment, when the user activates the Web browser 420 of the MFP 101, a request is made for screen information to the Web server 102 by an HTTP GET command. With this, the Web server 102 returns an HTTP response including a processing request to the MFP 101, and the Web browser of the MFP 101 examines whether or not the content type of the HTTP response header matches a predetermined one. Then, when it matches, the processing request is transferred to the service provider of the MFP 101. Here, security information such as the IP address of the Web server 102, and whether the communication between the Web application and the Web browser is encrypted is added to the processing request, and transferred.

When the service provider determines that that the processing request is sent from a loopback address, an IP address of the Web server of the transmission source is obtained from the security information. On the other hand, when not sent from a loopback address, the address of the transmission source of that processing request is identified, and if the address of the transmission source is stored as reliability information, it is determined that the transmission source of the processing request can be trusted, and the processing corresponding to that processing request is executed.

With this, even in a case where the environment is such that the MFP is protected by a firewall, or network address translation is used, the service provider of the MFP is able to receive the processing request from the Web server. Then, the service provider determines whether or not the address of the transmission source included in the processing request matches an address stored as an address that can be trusted, and only in cases where it matches an address that can be trusted the processing corresponding to that processing request can be executed. With this, even in a case where the MFP is protected by a firewall, it becomes possible for the Web application that the MFP is determined can be trusted to be able to obtain information of the MFP, the user, or the like, and to keep to a minimum the transmission of information to the Web server from the MFP.

Figure 6:
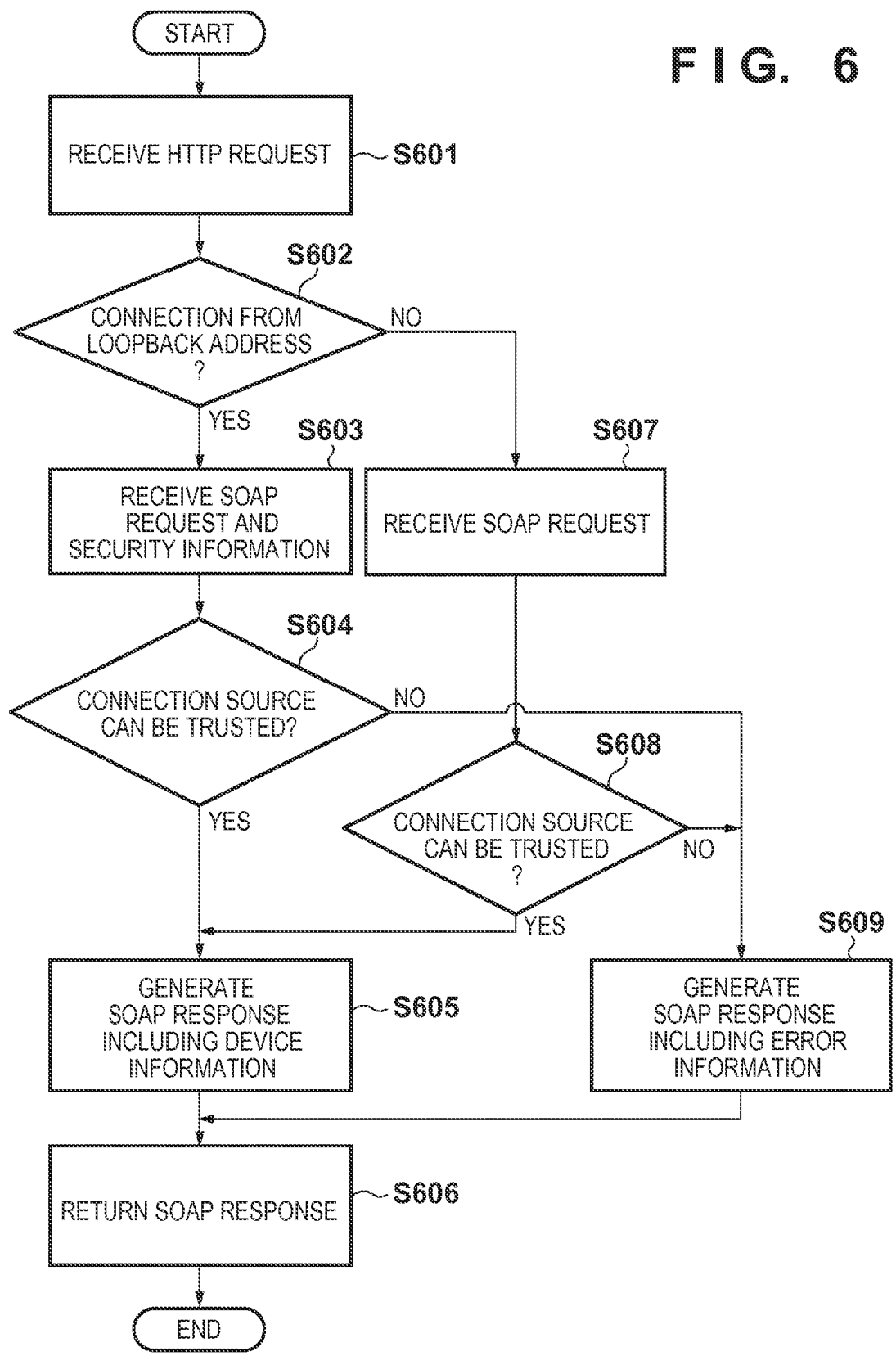
FIG. 6 is a flowchart for describing processing by a service provider of the MFP according to embodiments.

FIG. 6 is a flowchart for describing processing by a service provider 440 of the MFP 101 according to embodiments.

Because the processing by the service provider 440 is explained previously in steps S504 through S507 of FIG. 5, explanation will be given by supplementing only missing parts.

In step S601, the communication unit 441 of the service provider 440 receives the processing request that the transfer application 430 transmitted and the security information. Next, the processing proceeds to step S602, and as is executed in step S505 of FIG. 5, it is determined whether or not the processing request was sent from a loopback address. Here, in a case where it is determined that the received processing request is sent from a loopback address, the processing proceeds to step S603, and when that is not the case the processing proceeds to step S607. In step S603, the processing unit 443 of the service provider 440 receives the processing request and the security information via the communication unit 441. Then the processing proceeds to step S604, and as shown in step S506 of FIG. 5, it is determined whether or not the request source of the processing request can be trusted. Here, for the determination of whether or not the transmission source can be trusted, the security information received in step S504 is used. Then, in a case where it is determined that the transmission source can be trusted, the processing proceeds to step S605, and in a case where it is determined that it cannot be trusted the processing proceeds to step S609.

In step S605, the processing unit 443 of the service provider 440 executes the processing in accordance with the processing request. That processing request is a device serial number acquisition request, and the processing unit 440 acquires the device serial number from the device serial number from information providing unit (not shown) of the MFP 101, and generates a processing result. Then, the processing proceeds to step S606, and the service provider 440 makes a response to the transfer application 430 of the processing result or the error result made in step S605 or in step S609.

On the other hand, when the processing request is not sent from the loopback address in step S602, the processing proceeds to step S607, and the processing unit 443 of the service provider 440 receives the processing request (FIG. 8A) via the communication unit 441. Then, the processing proceeds to step S608, and similarly to step S604, it is determined whether or not the request source of the processing request can be trusted. Here, in the determination of whether the transmission source can be trusted, the transmission source address is identified based on the information when the communication unit 441 actually performs communication. Then, in a case where it is determined that the transmission source can be trusted, the processing proceeds to step S605, and in a case where it is determined that it cannot be trusted, the processing proceeds to step S609. In step S609, the processing unit 443 of the service provider 440 generates an error result in accordance with the determination that the transmission source cannot be trusted in step S604 or step S608, and the processing proceeds to step S606.

FIG. 7 is a view for illustrating an example of an HTTP response header that the Web application 410 returns to the Web browser 420 according to embodiments.

A HTTP response header 700 includes the destination 701, a transfer content type 702, an upload destination 703, and a content type 704.

The destination 701, as mentioned previously, is a destination when, in step S504 of FIG. 5, the transfer application 430 transfers an HTTP response body which is a processing request. The destination 701 indicates which out of the plurality of services that the service provider publishes.

The transfer content type 702 is the content described in the Content-Type field of the HTTP header, in step S504 of FIG. 5, when the transfer application 430 transfers the HTTP response body to the service provider 440. It is because it is necessary to describe a Content-Type that the transfer destination service provider 440 can understand correctly when transferring using an HTTP POST command. Configuration may be taken such that in a case where the transfer content type 702 is omitted, the transfer application 430 sets a default value upon transfer.

The upload destination 703, as mentioned previously, is the destination when the Web browser 420 uploads the processing result to the Web application 410 in step S509 of FIG. 5.

The content type 704, as mentioned previously, is used in the determination in step S503 of FIG. 5 of whether the content of the HTTP response body received in step S502 is a processing request or HTML content to be displayed on the Web browser 420.

FIG. 8A is a view for showing an example of content of a processing request that the Web application 410 generates, and that is returned to the Web browser 420 as a response.

A processing request 800 comprises the device serial number acquisition request 801, and is included in the response body that the Web browser 420 receives in step S502. The processing request 800 is described by an XML (Extensible Markup Language) format, but if the processing corresponding to the MFP 101 can be described, and it is a format that the MFP 101 is able to process, anything may be used.

A device serial number acquisition request 801 is a command for making a request for device serial number acquisition to the MFP 101.

FIG. 8B is a view for showing an example content of a processing result that the service provider 440 generates and that is returned to the transfer application 430 as a response.

A processing result 810 includes a processing result code 811 and a device serial number 812. The processing result 810, similarly to the processing request 800, is described in an XML format, but it may be another format. In the processing result code 811, the processing result code of the processing executed by the service provider 440 is described. The Web application 410 can generate HTML content in accordance with the processing result for the user, and can transmit it to the Web browser 420 having received the processing result 810 by an upload of the Web browser 420. In a case where the service provider 440 succeeds in the execution of the processing, "ok" is described in the processing result code 811, and in a case where it failed, "ng", an error code, or the like is described. In the device serial number 812, the device serial number that the service provider 440 acquired in accordance with the device serial number acquisition request 801 (here is "aaa12345") is described.

FIG. 8C is a view for showing an example content of an error result that the service provider 440 generates and returns to the transfer application 430 as a response.

An error result 820 includes a processing result 821. In a processing result 821 "ng" is described, and this indicates that the service provider 440 failed in the execution of the processing.

FIG. 9 is a view for showing an example of the content of an HTTP request header when the transfer application 430 transfers the processing request 800 to the service provider 440.

A request header 900 upon transfer comprises security information 901. In the security information 901 an address of the server of the communication destination, and the existence or absence of encryption when communicating (in FIG. 9, it is encrypted (true)) is described. Other than this, information necessary for the determination of whether or not the request source of the processing request can be trusted such as information relating to the communication between the Web application and the Web browser may be described.

FIG. 10 is a view for showing an example of content of reliability information stored in a reliability information storage unit 450 of the MFP 101 according to embodiments.

In reliability information 1000 an address of the server that the MFP 101 should trust is described, and this is managed by an IP address (here it is "192.168.38.100"), the host name, or the like. However, the format of the information is not limited to this, and if the target server, and the Web application can be identified, another format may be used.

As explained above, by virtue of the present embodiment, the MFP receives a processing request which is a response to a Web browser from a Web application, transfers it to a service provider (a processing unit), and also transfers information relating to communication with the request source of the processing request to the processing unit. With this, the processing unit can determine whether or not the server, which is the request source of the processing request, can be trusted. Thus, even in a case where the MFP is protected by a firewall, a Web application which the MFP determines can be trusted is able to obtain information of the MFP, a user, or the like, and it becomes possible to keep to a minimum transmission of information to a Web server from the MFP.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-118304 filed on Jun. 4, 2013, which is hereby incorporated by reference herein in its entirety.

What is claimed is:

1. An information processing apparatus comprising a Web browser and a service provider for executing a processing request, the Web browser comprising:
  (a) a first reception unit configured to receive a first processing request from a Web server, and
  (b) an adding unit configured to add information indicating a transmission source of the first processing request to the first processing request, and
  (c) a transferring unit configured to transfer the first processing request to the service provider, and
the service provider comprising:
  (a) a second reception unit configured to receive the processing request, the processing request being one of (1) the first processing request and (2) a second processing request received from a transmission source other than the Web server,
  (b) a first determination unit configured to determine whether or not the received processing request is the first processing request received from the Web server or the second processing request received from a transmission source other than the Web server,
  (c) a second determination unit configured to, in a case where the first determination unit has determined that the received processing request is the first processing request received from the Web server, determine whether or not the transmission source of the received processing request can be trusted, using the information indicating the transmission source added to the first processing request by the Web browser,
  (d) a third determination unit configured to, in a case where the first determination unit has determined that the received processing request is the second processing request received from a transmission source other than the Web server, determine whether or not the transmission source of the received processing request can be trusted, using the transmission source of the received processing request, and
  (e) a control unit configured to control whether or not to execute the received processing request based on a determination result of the second determination unit or a determination result of the third determination unit.

2. The information processing apparatus according to claim 1, wherein the control unit controls to execute the received processing request in a case where the second determination unit has determined that the transmission source of the received processing request can be trusted.

3. The information processing apparatus according to claim 1, wherein the control unit controls to execute the received processing request in a case where the second determination unit or the third determination unit has determined that the transmission source of the received processing request can be trusted.

4. A method for controlling an information processing apparatus comprising a Web browser and a service provider executing a processing request, the method comprising:
  a first reception step of receiving, by the Web browser, a first processing request from a Web server;
  an adding step of adding, by the Web browser, information indicating a transmission source of the first processing request to the first processing request;
  a transferring step of transferring, by the Web browser, the first processing request to the service provider;
  a second reception step of receiving, by the service provider, the processing request, the processing request being one of (1) the first processing request and (2) a second processing request received from a transmission source other than the Web server;
  a first determination step of determining, by the service provider, whether or not the received processing request is the first processing request received from the Web server or the second processing request received from a transmission source other than the Web server;
  a second determination step of, in a case where it has been determined in the first determination step that the received processing request is the first processing request received from the Web server, determining, by the service provider, whether or not the transmission source of the received processing request can be trusted, using the information indicating the transmission source added to the first processing request by the Web browser;
  a third determination step of, in a case where it has been determined in the first determination step that the received processing request is the second processing request received from a transmission source other than the Web server, determining, by the service provider, whether or not the transmission source of the received processing request can be trusted, using the transmission source of the received processing request; and
  a control step of controlling, by the service provider, whether or not to execute the received processing request based on a determination result of the second determination step or a determination result of the third determination step.

5. The method according to claim 4, wherein the received processing request is controlled in the control step to execute in a case where it has been determined in the second determination step that the transmission source of the received processing request can be trusted.

6. The method according to claim 4, wherein the received processing request is controlled in the control step to execute in a case where it has been determined in the second determination step or the third determination step that the transmission source of the received processing request can be trusted.

7. A non-transitory computer-readable storage medium storing a computer program for causing a computer to execute a method for controlling an information processing apparatus comprising a Web browser and a service provider for executing a processing request, the method comprising:
  a first reception step of receiving, by the Web browser, a first processing request from a Web server;
  an adding step of adding, by the Web browser, information indicating a transmission source of the first processing request to the first processing request;
  a transferring step of transferring, by the Web browser, the first processing request to the service provider;
  a second reception step of receiving, by the service provider, the processing request, the processing request being one of (1) the first processing request and (2) a second processing request received from a transmission source other than the Web server;
  a first determination step of determining, by the service provider, whether or not the received processing request is the first processing request received from the Web server or the second processing request received from a transmission source other than the Web server;
  a second determination step of, in a case where it has been determined in the first determination step that the received processing request is the first processing request received from the Web server, determining, by the service provider, whether or not the transmission source of the received processing request can be trusted, using the information indicating the transmission source added to the first processing request by the Web browser;

a third determination step of, in a case where it has been determined in the first determination step that the received processing request is the second processing request received from a transmission source other than the Web server, determining, by the service provider, whether or not the transmission source of the received processing request can be trusted, using the transmission source of the received processing request; and a control step of controlling, by the service provider, whether or not to execute the received processing request based on a determination result of the second determination step or a determination result of the third determination step.

8. The storage medium according to claim 7, wherein the received processing request is controlled in the control step to execute in a case where the second determination unit has determined that the transmission source of the received processing request can be trusted.

9. The storage medium according to claim 7, wherein the received processing request is controlled in the control step to execute in a case where it has been determined in the second determination step or the third determination step that the transmission source of the received processing request can be trusted.

10. The information processing apparatus according to claim 1, wherein the transmission source of the first processing request, and wherein the information indicating a transmission source of the first processing request is one of an IP address, a host name, and information about the existence or absence of encryption.

* * * * *